Figure 1:
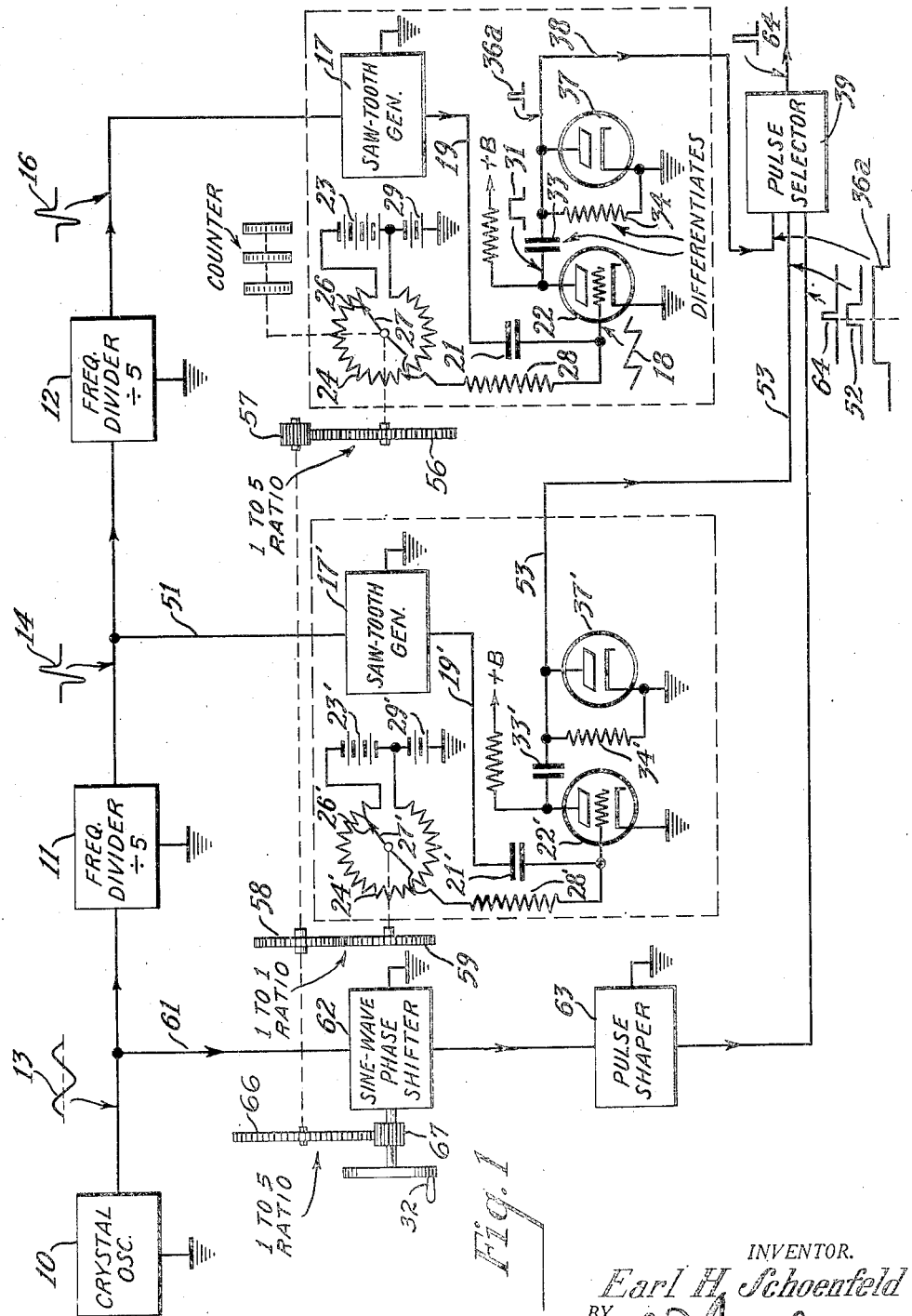

April 5, 1949.  E. H. SCHOENFELD  2,466,044
PHASE SHIFTER FOR PULSE PRODUCERS
Filed March 28, 1946  3 Sheets-Sheet 1

INVENTOR.
Earl H. Schoenfeld
BY
ATTORNEY.

April 5, 1949.  E. H. SCHOENFELD  2,466,044
PHASE SHIFTER FOR PULSE PRODUCERS

Filed March 28, 1946  3 Sheets-Sheet 2

INVENTOR.
Earl H. Schoenfeld
BY
ATTORNEY.

INVENTOR.
Earl H. Schoenfeld
BY
ATTORNEY.

Patented Apr. 5, 1949

2,466,044

UNITED STATES PATENT OFFICE 2,466,044

PHASE SHIFTER FOR PULSE PRODUCERS

Earl H. Schoenfeld, Mamaroneck, N. Y., assignor to Radio Corporation of America, a corporation of Delaware Application March 28, 1946, Serial No. 657,686

1 Claim. (Cl. 250—36)

My invention relates to phase shifting apparatus and particularly to a method of and means for shifting the timing or phase of electrical pulses.

The present invention is particularly applicable to radio navigation systems of the type known as Loran systems. Such a system is described in application Serial No. 560,648, filed October 27, 1944, in the name of George D. Hulst, Jr., Patent No. 2,430,570, November 11, 1947, and entitled Radio navigation system. It is the preferred practice to utilize in these systems a chain of frequency dividers of the type that provides a pulse output. It may be desirable to shift the phase of a pulse from the divider chain in a continuous and uniform manner through more than 360 degrees so that, after a pair of received pulses have been aligned by such a phase shift, the reading in microseconds required for Loran navigation can be read directly off the phase shifter scale.

Such a continuous and uniform phase shift of a pulse is obtained in the navigation systems known as Shoran systems by utilizing goniometer type phase shifter units which are geared together, this being feasible because the Shoran systems employ a chain of frequency divider units that have sine wave outputs. Thus, the sine wave outputs may be supplied to the goniometer units which, of course, require a sine wave source. In the Loran systems, since the frequency divider chain supplies pulses instead of sine waves, a plurality of geared goniometer units cannot be used unless the pulses are first converted to sine waves. Such conversion results in undesirable complication of the system.

An object of the present invention is to provide an improved method of and means for shifting the phase of electrical pulses.

A further object of the invention is to provide an improved method of and means for shifting the phase of a pulse continuously through more than 360 degrees.

According to a preferred embodiment of the invention, the pulse from each unit of a frequency divider chain is delayed a variable amount by supplying it to a sawtooth generator to produce a sawtooth wave. The sawtooth wave is passed through a clipping circuit that has its slipping level determined by a variable bias so that the front edge of a pulse produced by the clipping circuit starts at a time determined by the bias setting. The pulse thus produced is differentiated whereby there is obtained the desired delayed pulse which has the same timing as said front edge. The variable bias controls of the several delay circuits are geared together with the gear ratio for each bias control the same as the amount of frequency division at the corresponding frequency divider unit.

The delayed pulses thus obtained from the several clipper circuits are applied to a pulse selector, described hereinafter, so that there is obtained a pulse that may be shifted in phase through many times 360 degrees. The use of a pulse selector in this way is described for use with a Shoran system in application Serial No. 638,387, filed December 29, 1945, in the name of Stuart W. Seeley and entitled Radio navigation system.

Figure 2:
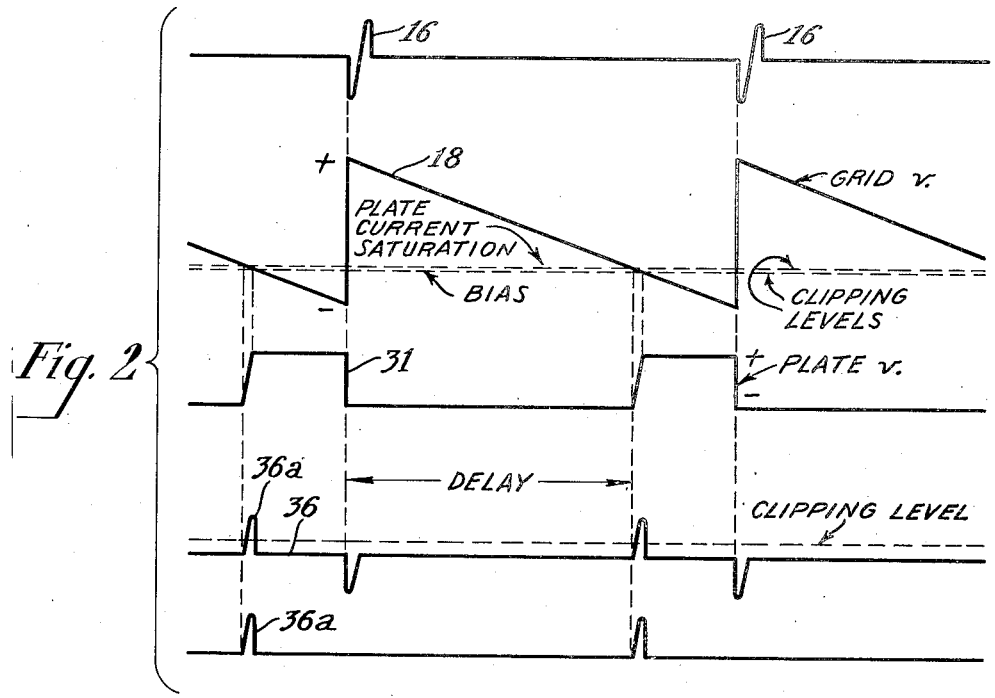
Figure 4:
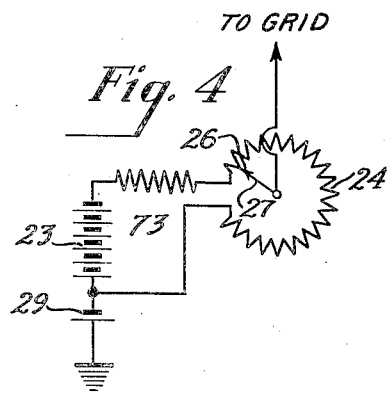
Figure 5:
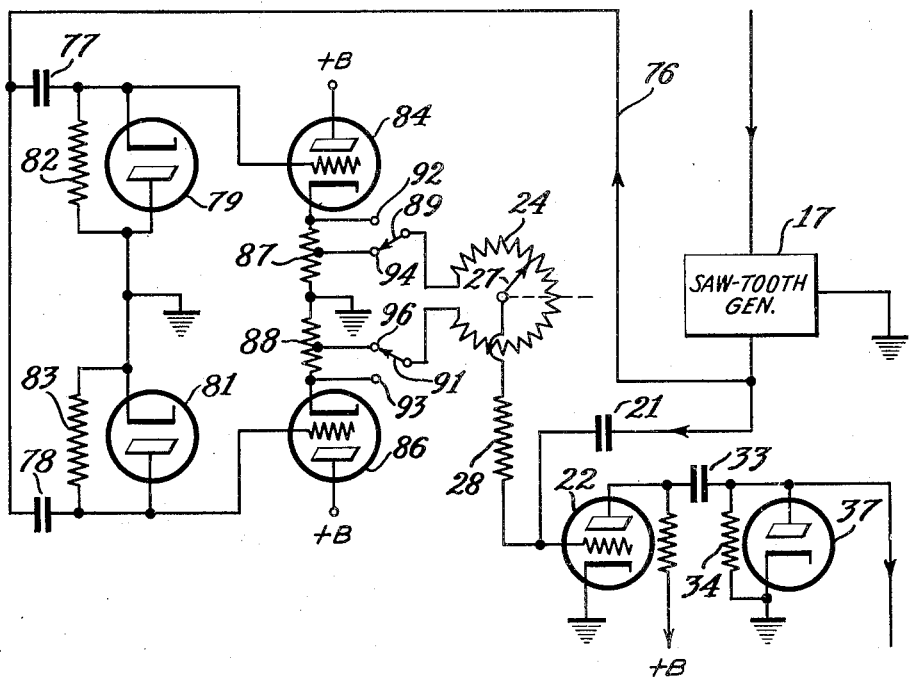
Figure 6:
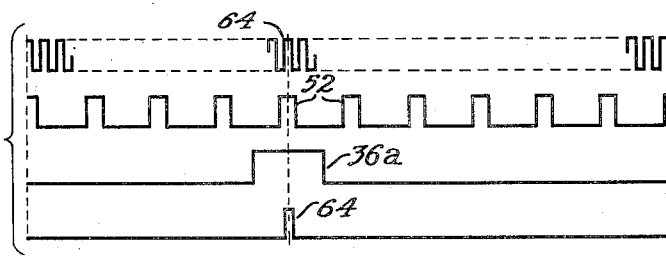
Figure 7:
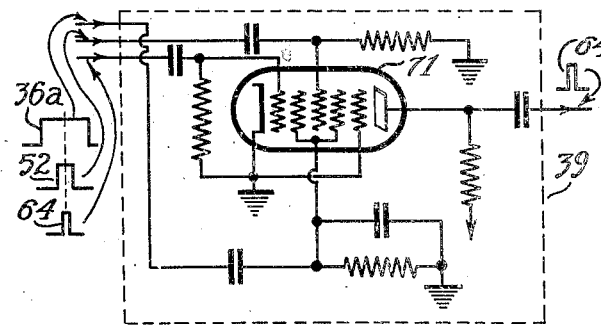

The invention will be better understood from the following description taken in connection with the accompanying drawing in which:

Figure 1 is a block and circuit diagram of one embodiment of the invention,

Figure 2 is a group of graphs that are referred to in explaining the operation of the apparatus shown in Fig. 1, Figures 3, 4 and 5 are circuit diagrams of bias varying circuits that may be employed in the apparatus of Fig. 1, Figure 6 is a group of graphs that are referred to in explaining the operation of the pulse selector included in the circuit of Fig. 1, and Figure 7 is a circuit diagram of a pulse selector.

In the several figures, similar parts are indicated by similar reference characters.

Fig. 1 shows a crystal oscillator 10 and a frequency divider chain comprising two frequency divider units 11 and 12, each of which divides by five in the example illustrated. The oscillator 10 has a sine wave output indicated by the graph 13 while the dividers 11 and 12 have pulse outputs such as the blocking oscillator outputs indicated by the graphs 14 and 16.

The divider chain output pulses 16 are supplied to a sawtooth wave generator 17 which, as shown in Fig. 2, produces sawtooth voltage waves 18 in synchronism with the applied pulses. The sawtooth waves 18 are supplied over a coupling capacitor 21 to the grid of a clipping tube 22.

Variable negative bias is supplied to the grid of the tube 22 by means of a biasing circuit which comprises a battery 23 across which is connected a potentiometer resistor 24 having a variable tap 26 thereon carried by a rotatable arm 27. The potentiometer arm 27 is connected through a resistor 28 to the grid of the tube 22. A fixed negative bias may be supplied in addition to the variable bias by a battery 29.

The output of the clipping tube 22 is a rectangular pulse 31. The timing of the front edge of the pulse 31 is determined, as shown in Fig. 2, by the level at which the sawtooth wave 18 is clipped, and this in turn is determined by the position of the potentiometer arm 27. As shown in Fig. 1, the position of arm 27 may be changed by means of a hand wheel 32 coupled to the arm 27 through a train of gears whereby the front edge of the pulse 31 is shifted.

The pulse 31 is differentiated by a differentiating circuit comprising a capacitor 33 and a resistor 34 to obtain the wave form 36 shown in Fig. 2. The wave 36 is then passed through a clipping diode 37 to obtain the positive pulses 36a only, and these are supplied over a conductor 38 to a pulse selector 39.

The output pulses 14 of the frequency divider 11 are supplied over a conductor 51 to a delay circuit that is similar to the delay circuit just described and in which similar parts are indicated by the same reference number with a prime added. The pulses indicated at 52 are supplied over a conductor 53 to the pulse selector 39. The pulses 52 have a repetition rate that is five times that of the pulses 36a. Also, the pulses 52 are narrower in width than the pulses 36a.

The potentiometer arm 27' is rotated by means of the hand wheel 32 at five times the rate of rotation of the potentiometer arm 27 since the drive for the arm 27 is through gears 58 and 59 having a 1 to 1 ratio whereas the drive for the arm 27 is through gears 56 and 57 having a 1 to 5 ratio.

The sine wave output 13 of the oscillator 10 is supplied over a conductor 61 to a goniometer type phase shifter 62. The output of the phase shifter 62 may be supplied to a pulse shaper 63 which clips or otherwise shapes the sine wave to produce a periodic pulse 64 which is supplied to the pulse selector 39. If preferred, the pulse shaper 63 may be omitted and a half cycle portion of the sine wave signal utilized as the pulse 64. The pulse 64 is narrower than the pulse 52 and has a periodic rate that is the same as the frequency of the oscillator 10.

The rotor of the phase shifter 62 is rotated at five times the rate of the potentiometer arm 27' since it is driven directly by the hand wheel 32 while the arm 27' is driven through a pair of gears 66 and 67 which have a 1 to 5 ratio and through the gears 58 and 59 having a 1 to 1 ratio.

Fig. 7 shows one example of a pulse selector. It comprises a vacuum tube 71 having a plurality of grids which are so biased that no signal appears in the plate circuit unless the pulses 64, 52, and 36a are on the grids simultaneously. Any suitable biasing, such as grid leak biasing, may be employed.

Fig. 6 shows how the phase shift of the pulse 36a selects first one of the pulses 52 and then another, and how the selected pulse 52 selects first one of the pulses 64 and then another. Thus a pulse 64, in effect, may be shifted continuously and uniformly through many times 360 degrees.

Figure 3:
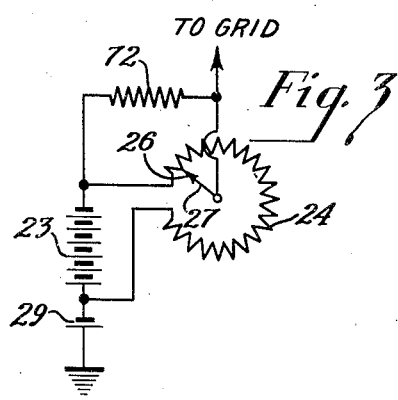

Figs. 3 and 4 show biasing potentiometer arrangements for avoiding an open circuit at the time the contact point 26 moves from one end of resistor 24 back to the starting end. In Fig. 3 this is accomplished by connecting the potentiometer arm 27 through a resistor 72 to the starting end of the potentiometer resistor 24. In Fig. 4, it is assumed that the ends of the resistor 24 are so close together that they are both in contact with the contact point or slider element 26 as it moves into position to repeat a biasing cycle. Shorting of the battery 23 at this time is prevented by a resistor 73.

It will be evident that in operation the cut-off bias line (Fig. 2) jumps from the bottom end of the sawtooth wave to the top end of the sawtooth wave when the contact point or slider 26 completes a traversal of the potentiometer resistor 24 and moves again into contact with the starting end of the resistor 24. Further rotation then causes linear shift downward of the cut-off bias line. Thus there is obtained a continuous phase shift.

From the foregoing description it is apparent that the two potentials at the ends of the potentiometer resistor 24 should be equal to the maximum and minimum potentials, respectively, of the sawtooth wave applied to the grid of the clipping tube. A circuit for providing and maintaining this equality regardless of minor amplitude variations in the sawtooth wave is shown in Fig. 5.

Referring to Fig. 5, the sawtooth wave from the generator 17 is applied over a conductor 76 and through coupling capacitors 77 and 78 to rectifier tubes 79 and 81, respectively. Thus, the positive and negative half cycles of the sawtooth wave (with respect to its A-C. axis) are rectified by the tubes 79 and 81. The rectified currents are smoothed or filtered by the capacitors 77 and 78 and by the leak resistors 82 and 83, respectively, so that they may be applied to the grids of a pair of amplifier tubes 84 and 86 for amplitude control of the bias voltage.

The bias voltage is taken off the cathode resistors 87 and 88 of the tubes 84 and 86, respectively, and is supplied to the ends of the potentiometer resistor 24 through switches 89 and 91. The tube 22 is cathode biased by an amount equal to its cut-off bias plus one-half the voltage across the potentiometer resistor 24. It will be apparent that a change in the amplitude of the sawtooth wave will cause a corresponding change in the value of the bias voltage across resistor 24 as desired.

The cathode resistors 87 and 88 are each provided with two taps connected to switch contact points 92 and 94 and to contact points 93 and 96. The adjustment is such that with the switch arms 89 and 91 on the contact points 92 and 93, the potentials applied to the ends of resistor 24 equal the maximum and minimum potentials, respectively, of the sawtooth wave.

The two taps for the contact points 94 and 96, however, are located so that the range of the bias voltage selected by the phase shifter is slightly less than the peak-to-peak voltage of the sawtooth wave. Thus, there is avoided two momentary conditions when there would be no output pulse from the phase shifter. One of these conditions is when the potentiometer slider is set so that cut-off bias occurs at the very bottom of the sawtooth wave; then the conduction of the clipping tube is continuous. The other of these conditions is when the slider is set so that cut-off bias is at the very top of the sawtooth wave; then the clipping tube is non-conducting at all times.

With the switches 89 and 91 on the contact points 94 and 96, the phase shifter will have a small discontinuity as the slider crosses the break in the potentiometer resistor. However, by careful design this sudden phase jump can be kept small so that any effect on the output pulse selector can be avoided. It will be evident from an inspection of Fig. 6 that slight variations or jumps in the phase of the comparatively wide pulse 36a will have no effect on the selection of a pulse 52 which is comparatively narrow. Likewise, slight jumps in the phase shift of a pulse 52 will have no effect on the selection of a pulse 64.

I claim as my invention:

In combination, means for producing pulses recurring at a periodic rate, means for producing a sawtooth wave in response to the occurrence of each of said pulses, means comprising a clipping tube and variable biasing means for said tube for clipping said sawtooth waves at a certain clipping level to produce pulses each having an edge that occurs at a time depending upon said clipping level, said variable bias means including means for rectifying and filtering a portion of said sawtooth wave signal whereby said bias changes in amplitude in response to a change in the amplitude of said sawtooth wave, means for differentiating said last pulses to produce delayed pulses each occurring at the same time as said edge whereby the timing of said delayed pulses may be varied by varying said clipping level, means for varying said bias for varying said clipping level, and means for passing only said delayed pulse to a utilization circuit.

EARL H. SCHOENFELD.

REFERENCES CITED

The following references are of record in the file of this patent:

UNITED STATES PATENTS

| Number | Name | Date |
|---|---|---|
| 2,105,870 | Vance | Jan. 18, 1938 |
| 2,171,536 | Bingley | Sept. 5, 1939 |
| 2,277,000 | Bingley | Mar. 17, 1942 |
| 2,355,363 | Christaldi | Aug. 8, 1944 |

FOREIGN PATENTS

| Number | Country | Date |
|---|---|---|
| 510,881 | Great Britain | Aug. 8, 1939 |